Figure 9:
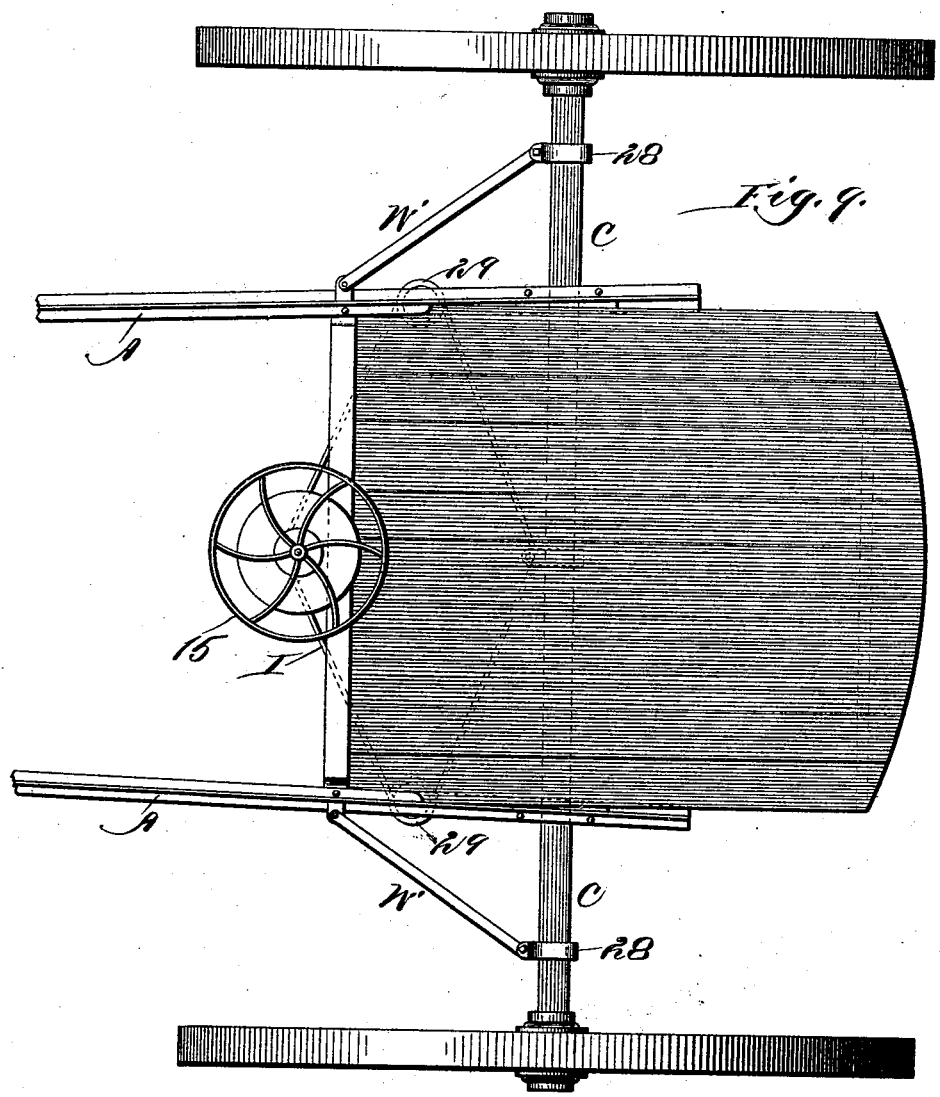

(No Model.) 6 Sheets—Sheet 1.
M. G. BUNNELL.
MACHINE FOR MAKING AND REPAIRING ROADS.
No. 511,997. Patented Jan. 2, 1894.
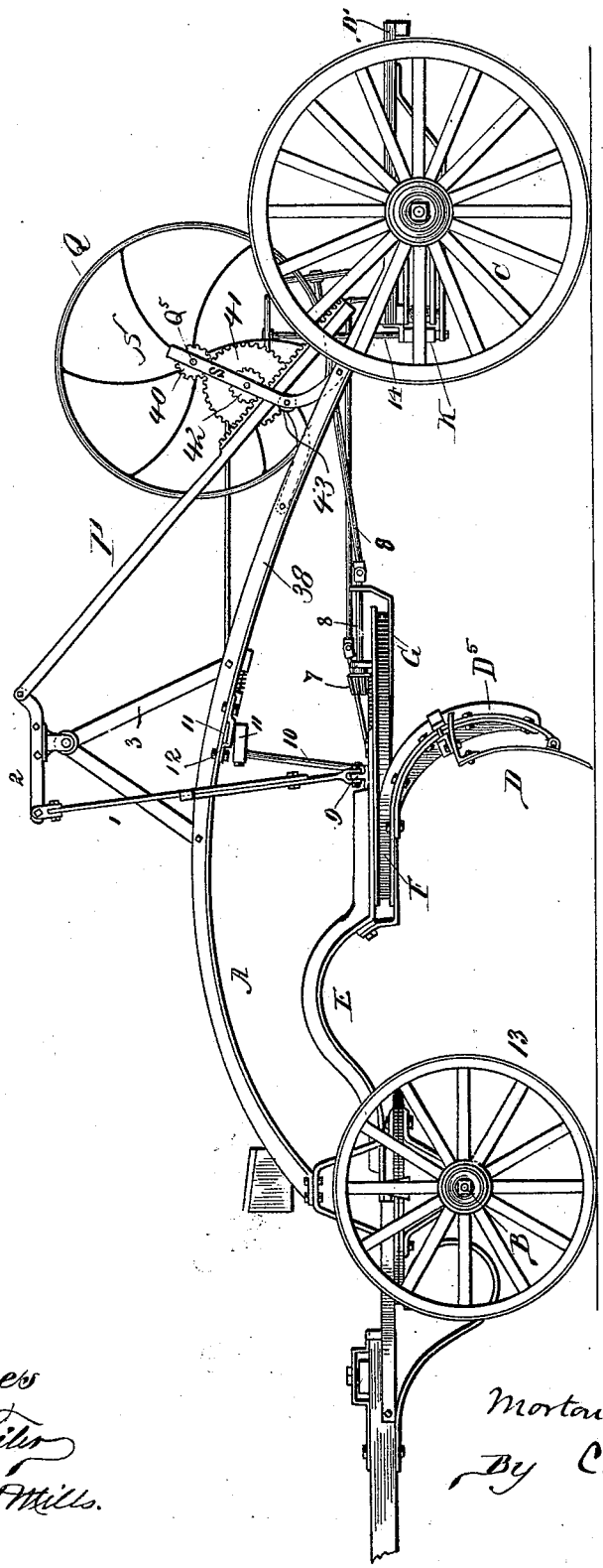

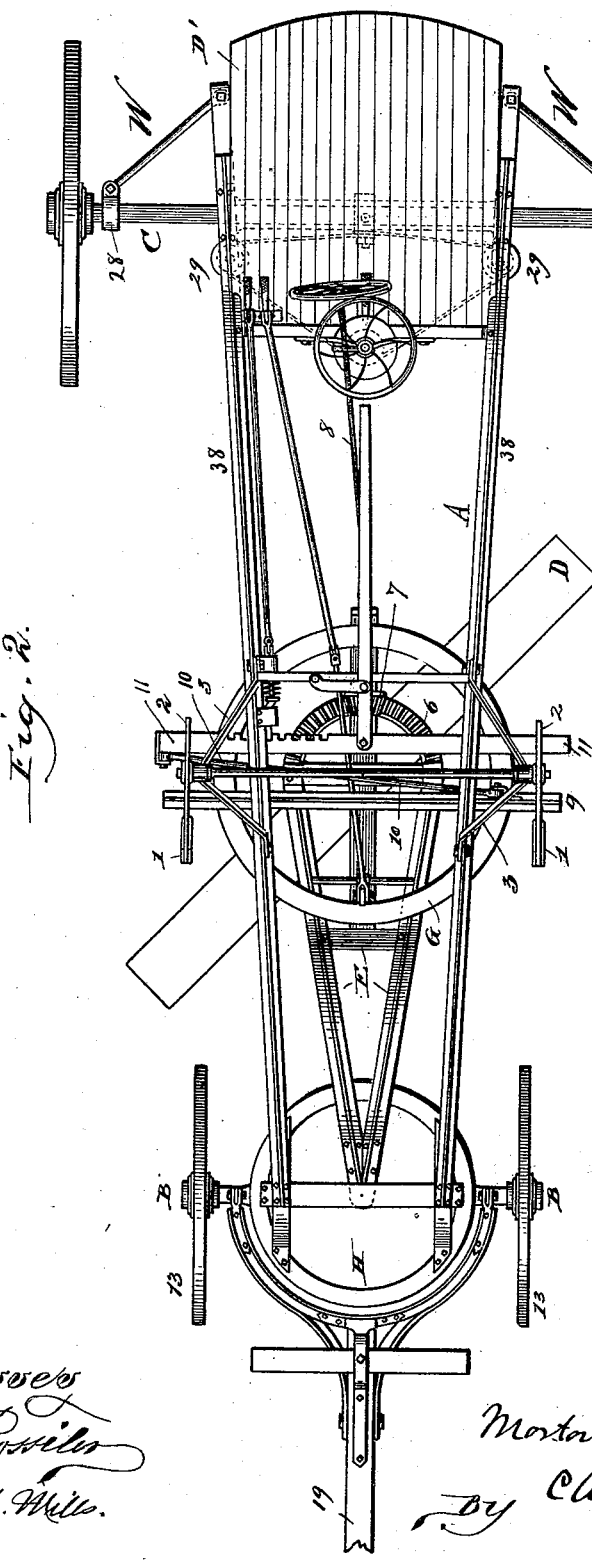

(No Model.) 6 Sheets—Sheet 3.
M. G. BUNNELL.
MACHINE FOR MAKING AND REPAIRING ROADS.
No. 511,997. Patented Jan. 2, 1894.
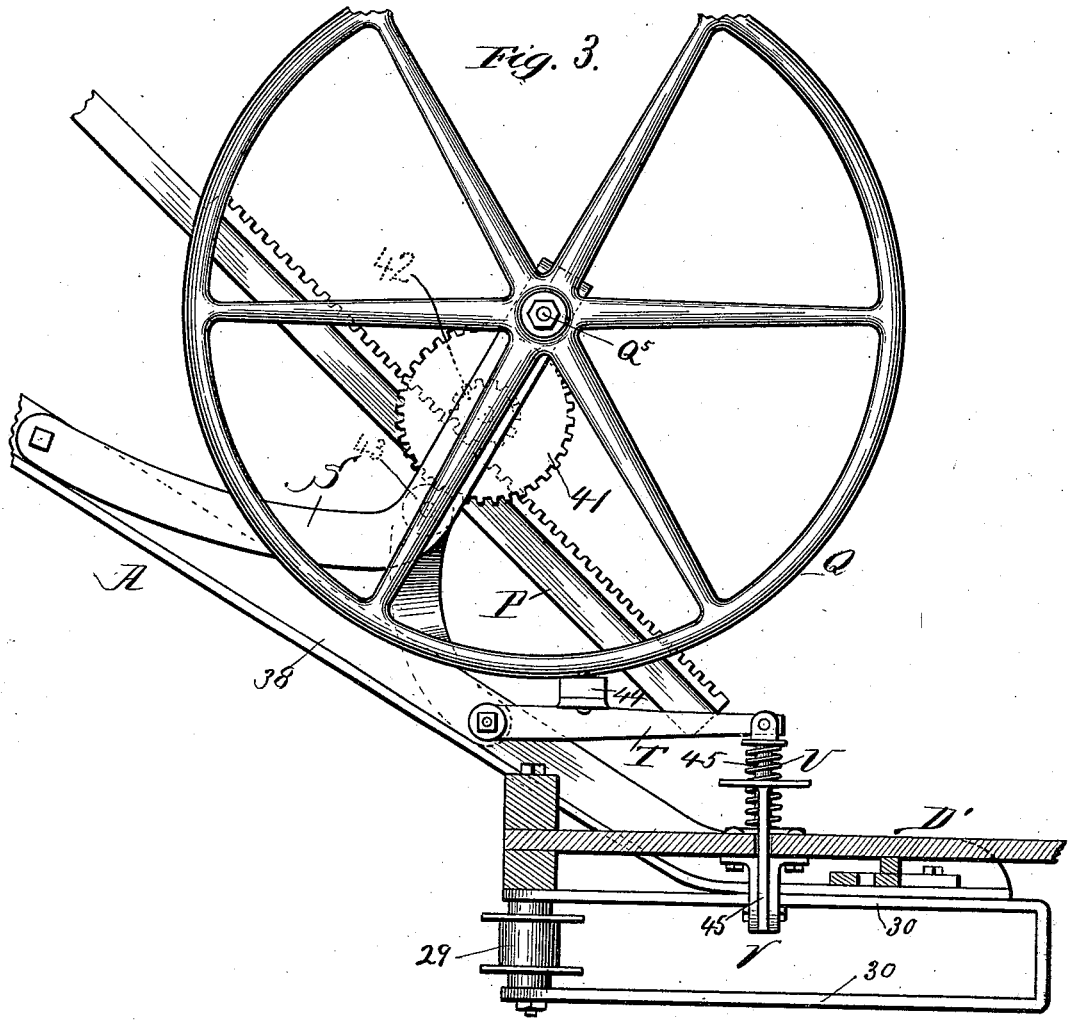
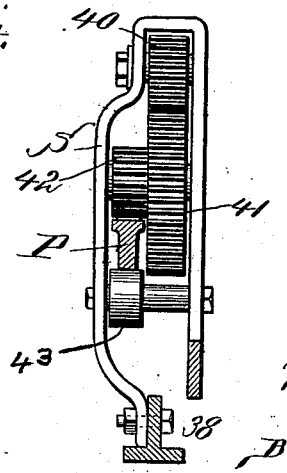
Witnesses
W. Rawles
Fredk. H. Mills
Inventor
Morton G. Bunnell
By Chas. G. Page
Atty.

(No Model.) 6 Sheets—Sheet 4.
M. G. BUNNELL.
MACHINE FOR MAKING AND REPAIRING ROADS.
No. 511,997. Patented Jan. 2, 1894.
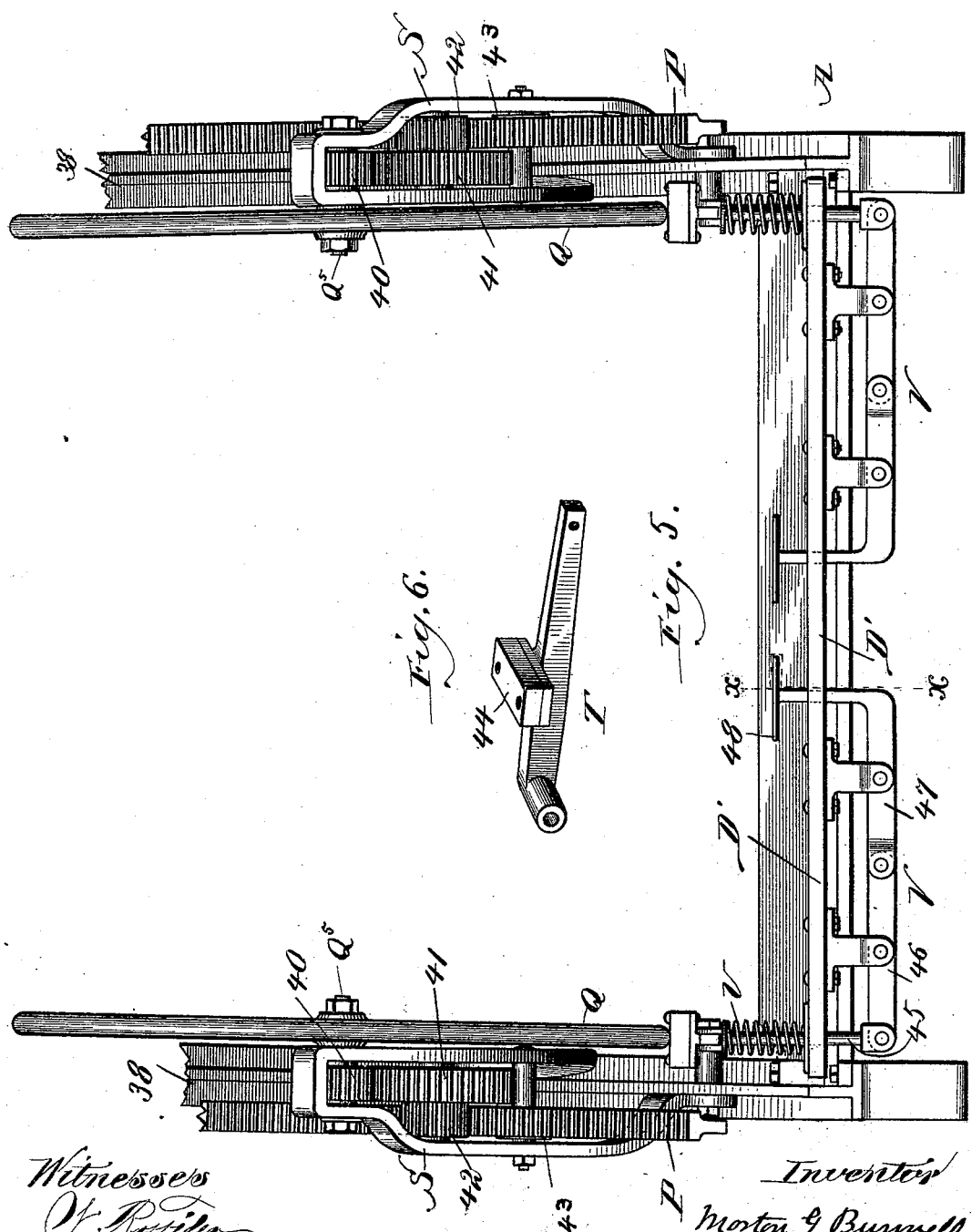

(No Model.)
M. G. BUNNELL.
MACHINE FOR MAKING AND REPAIRING ROADS.
No. 511,997. Patented Jan. 2, 1894.
6 Sheets—Sheet 5.
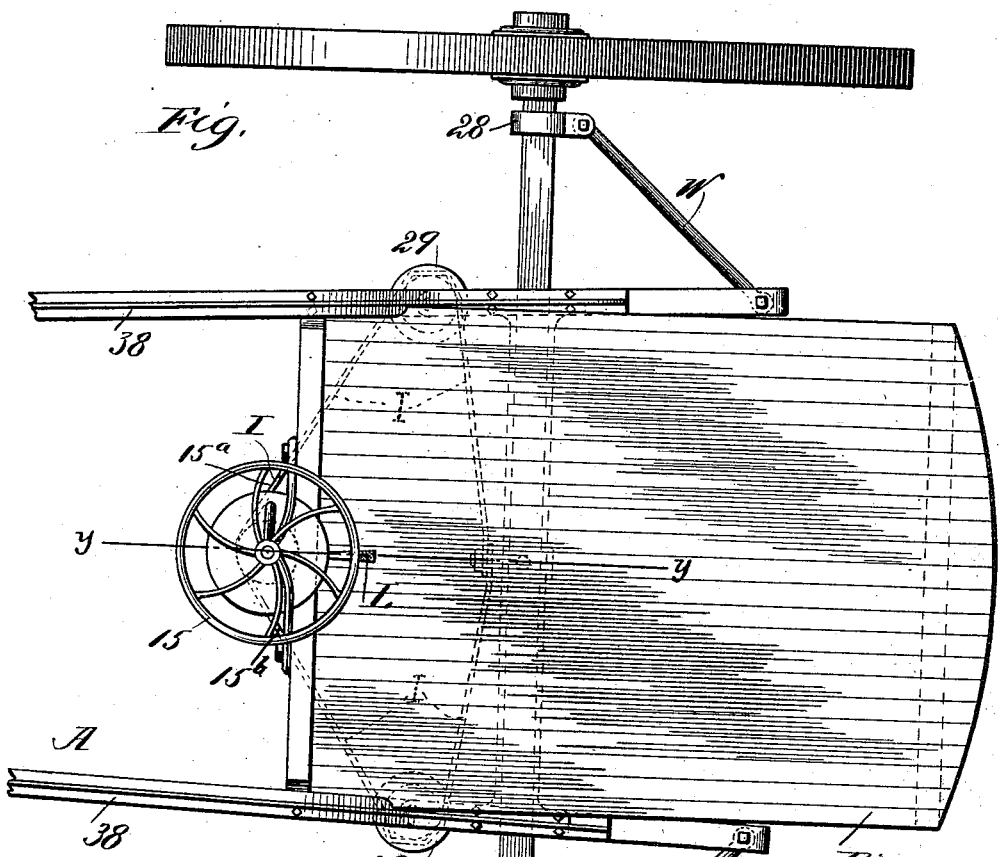
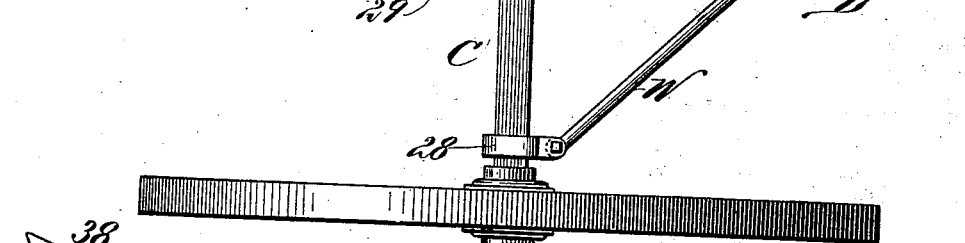
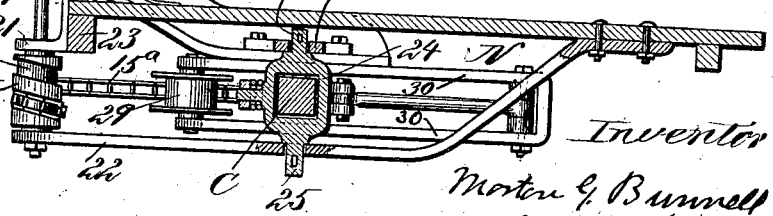

(No Model.)

M. G. BUNNELL.
MACHINE FOR MAKING AND REPAIRING ROADS.

No. 511,997. Patented Jan. 2, 1894.

UNITED STATES PATENT OFFICE.

MORTON G. BUNNELL, OF CHICAGO, ILLINOIS, ASSIGNOR TO FREDERICK C. AUSTIN, OF SAME PLACE.

MACHINE FOR MAKING AND REPAIRING ROADS.

SPECIFICATION forming part of Letters Patent No. 511,997, dated January 2, 1894.

Application filed March 3, 1891. Serial No. 383,589. (No model.)

*To all whom it may concern:*

Be it known that I, MORTON G. BUNNELL, a citizen of the United States, residing at Chicago, in the county of Cook and State of Illinois, have invented a certain new and useful Improvement in Machines for Making and Repairing Roads, of which the following is a specification.

My invention relates to a construction of road-working machines adapted for making and repairing roads; and involving a body-frame supported upon horizontally swinging front and rear axles, and a diagonally adjustable scraper-blade which can be set at any desired horizontal angle relatively to the general line of progression of the machine.

The objects of my invention are to provide improved means for raising and lowering the scraper-blade; to provide improved means for automatically locking the blade-raising mechanism, so as to hold the blade at any desired height; to provide for a combined end movement and horizontal swing on the part of the rear axle, so as to effect certain desirable changes in the position of the rear wheels relatively to the front wheels and position of the scraper-blade and to overcome such side draft as may result from the oblique or diagonal position of the scraper-blade.

To the attainment of the foregoing and other useful ends, my invention consists in matters hereinafter set forth.

In the accompanying drawings:—Figure 1 represents, in side elevation, a machine for making and repairing roads, involving my invention. Fig. 2 is a top plan view of the same. Of the remaining figures, which are on a scale somewhat larger than that of Figs. 1 and 2, Fig. 3 represents a portion of one of the blade-raising and lowering mechanisms, in side elevation; and a section taken through the rear platform on line $x—x$ in Fig. 5. Fig. 4 is a section taken transversely through one of the rack bars and one of the body-frame sides, so as to show in edge elevation a set of cogs or gears which connect the rack-bar with a hand-wheel shaft. Fig. 5 represents, in rear elevation, the blade-raising and lowering mechanisms, each comprising the portion illustrated in Fig. 3. Fig. 6 represents, in perspective, one of the brake-arms provided with a shoe. Fig. 7 is a top plan view of a part of the rear end portion of the machine. Fig. 8 is a section on line $y—y$ in Fig. 7, the hand-wheel shaft and devices thereon being however in elevation. Fig. 9 is a top plan of the rear portion of the machine with the links having their rear ends pivotally connected with the rear axle and their forward ends pivotally connected with the body frame at points in advance of the rear axle.

In said drawings:—A indicates the body-frame, which is pivotally supported at its forward end upon the horizontally swinging front axle B; which said axle is provided with wheels 13. While the body-frame can be pivotally connected with the front axle in various ways, I prefer providing as a pivotal connection between the two, a fifth wheel H.

The scraper-blade D is adjustable diagonally with relation to the line of progression of the machine; and is arranged to extend across the space between the front and rear wheels. The scraper-blade can be pushed from the rear, as in various kinds of road-working machines; but as a preferred arrangement, it is herein drawn by a swinging draft bar E. The scraper-blade is attached to the downwardly extending arms of a segment or half-circle F; which latter is secured to a circle or turn-table G pivotally connected with the draft-bar E.

The turn-table can be operated by any suitable means, for the purpose of swinging the scraper-blade horizontally about a point between its ends; as, for example, by a hand-wheel shaft 8 provided with a pinion 7 arranged to engage a curved rack 6 which is rigid with the circle. The blade can be swung bodily toward each side of the machine; and, to such end I can employ a cross-bar 9 rigid with the circle and connected by a link 10 with a slide bar 11 supported in bearings 12 on the body-frame. The scraper-blade is suspended from vibratory levers 2 by hangers 1 which are at their lower ends conveniently connected with the bar 9. By operating said levers 2 independently of one another, the scraper-blade can be raised and lowered independently at its ends; and, by operating the levers simultaneously, the blade as a whole can be raised and lowered.

The foregoing general description is sufficient for the purposes of the present application since the matters referred to are fully set forth in detail in Letters Patent of the United States Nos. 427,738 and 427,739.

As a means for operating the levers 2, I provide two devices or mechanisms similar to but operative independently of one another; and connect them respectively with one and the other of said levers 2. Each one of said devices for thus raising and lowering the blade comprises an inclined rack P, which is gear-connected with a hand-wheel Q mounted upon the body-frame. The hand-wheels Q are arranged respectively at opposite sides of the machines; and have their shafts or axles journaled in supports S, which are rigid with and arranged to rise from the sides 38 of the body-frame. These supports S have their sides set apart, so as to receive between them the gears for connecting the hand wheel axles with the racks, and also provide bearings for the journals of said gears. Each hand-wheel axle is provided with a cog or small gear 40, rigid with the same and arranged to engage a larger gear 41, which is in turn rigid with a small gear or cog 42 arranged to engage one of the racks. The racks are supported by anti-friction rolls 43, which are mounted within the supports S and arranged to maintain the racks in engagement with the cogs 42. By the foregoing arrangement, a quick and powerful action can be obtained.

As a means for automatically locking the hand-wheels so as to hold the scraper-blade at any desired vertical adjustment, I provide in connection with each hand-wheel a friction-brake device. The construction of brake device herein involved comprises a vibratory arm T provided between its ends with a shoe 44 and, at its forward end, pivoted upon a side of the body-frame. The vibratory arm is normally maintained, by the expansive force of a spring U, in position to hold the shoe against the hand-wheel. To such end, the spring is arranged between the rear end of the arm T and the platform D', which is below said arm. The arm T can be swung down by a cord, link or rod 45, which is at its upper end pivotally connected with the arm T above the platform, and at its lower end pivotally connected with a compound lever V arranged below the platform. The compound lever sections 46 and 47 are fulcrumed in bearings secured to the under side of the platform and arranged so that the compound lever shall lie transverse to the length of the machine. The sections of the compound lever are pivoted together; and section 47 of said lever has its end, which is nearest the middle longitudinal line of the machine, bent upwardly so as to provide a tread 48 for the foot of an attendant who may stand upon the platform. The tread may be formed separate from the lever section 47 but I prefer making the two in one piece. By the foregoing construction, the two treads can be positioned near together and adjacent to the longitudinal middle of the platform; and hence, while they will be in position to permit the attendant to operate them without stepping to one side, the arms carrying the shoes can, by reason of the compound levers, be drawn down against exceedingly strong springs. This last mentioned feature is most important, for the reason that the hand-wheel must be locked against the great weight of the draft-bar, circle, segment, scraper-blade and hangers. The rear axle C, which supports the rear end of the body-frame, is capable of a combined horizontally-swinging and end movement independent of the body-frame. The end portions of the rear axle extend through horizontal guide ways 30 on the body-frame; said guide-ways being conveniently formed by guide bearings secured to the under-sides of the side portions of the body-frame. The guide-ways 30 are parallel with the length of the body-frame, and are proportional in length to the greatest desired extent of swing on the part of said axle. While, therefore, the rear axle may have an end movement, its end portions may also swing back and forth in the guide-ways. The end portions of the rear axle are connected with the body-frame by swinging rods or links W (Fig. 2, 7 and 8) which control the said axle in its compound movement; it being seen that a force tending to shift the axle endwise or to move the body-frame sidewise toward either rear wheel will cause the rear axle to swing horizontally about a point midway of its ends but will also in effect shift the rear axle longitudinally. Of course, in practice, the combined end shift and swing of the axle is attained by a lateral movement of the body-frame; which said movement will cause a swing on the part of the axle and also set the body-frame over toward one or the other of the rear wheels, thus practically attaining the effect of an end shift on the part of the rear axle. By this arrangement I attain a wide range of adjustment on the part of the rear wheels relatively to the scraper-blade and also relatively to the front wheels, and further permit the rear wheels to be set in such relationship to the body-frame that I can utilize the side draft caused by the resistance of the soil to the diagonally set scraper-blade as a means for preventing such side draft from swinging the rear end of the machine to one side. Thus, when the rear axle is adjusted from its position at right angles to the length of the body-frame, the rear wheels will run to one side until the body-frame is swung about its pivotal connection with the front axle to an extent to restore parallelism between the two axles. The body-frame will then be oblique to the line of progression and will be so held by reason of the disposition of the rear wheels to run straight ahead. When, therefore, the side draft tends to swing the body-frame back into line with the direct line of progression the tendency of the rear wheels to run straight ahead will overcome such disposition on the part of the body-frame to swing back into line; and, hence, the side draft will be automatically resisted.

The adjustment of the rear axle into a position oblique to the length of the body-frame causes a lateral swing on the part of the body-frame; and, hence, serves to shift to one side the point at which the scraper-blade is pivotally carried between the front and rear wheels; and, by reason of the end movement or adjustment of the rear axle, as aforesaid, the point at which the scraper-blade is pivotally held can be set to one side to a greater extent than could be attained solely by reason of the swinging adjustment on the part of the rear axle.

As a means for operating the rear axle, I may obviously employ various systems of levers, gearing and the like; but, as a simple and preferred way, I arrange upon the body-frame of the machine a hand wheel shaft 14 and connect the same with the rear axle by a cord or chain I, or like flexible connection, which can be moved in opposite directions according to the direction in which the hand wheel shaft is turned. The chain I, can be connected with the axle midway of the ends of the latter as indicated in dotted lines and arranged to pass about pulleys 29 mounted upon the body-frame at opposite sides thereof. The chain may be continuous and pass about a sprocket on the hand-wheel shaft, or the chain can be divided into a couple of lengths 15ª 15ᵇ having their forward ends attached to a winding drum K formed with or secured upon the wheel shaft and provided with a spiral guide-groove 16 for the chain or chains.

The hand-wheel shaft can be locked by a foot latch L supported upon the body-frame and arranged to engage a notched plate or wheel 17 fixed upon said hand-wheel shaft.

By adjusting the rear axle in the manner aforesaid, the scraper-blade can be brought into various desired positions with reference to the wheels and character of the work to be done; and the rear wheels can be set both with reference to the front wheels and with reference to the diagonal adjustment of the scraper-blade. Either wheel of the long rear axle, adjustable as aforesaid, can, when so desired, be brought into alignment with the wheel ahead of it, so as to permit the machine to work close up to a bank or allow one rear wheel to run in a furrow formed by the blade. The rear wheels can also be caused to run in various selected lines with reference to the work; and all of these various adjustments can be readily brought about by an attendant standing upon the rear platform of the machine. As a preferred arrangement, the links W are arranged to extend back from the rear axle, being at their forward ends pivotally connected with clips or collars 28 on the axle, and at their rear ends connected with the sides of the body-frame at points back of the axle, and, in order to cause the axle to swing properly so that one or the other of its ends shall be swung ahead, according to the direction in which it is moved endwise, the links or jointed connections W converge toward the rear of the machine. The links may for the broader purpose of my invention be arranged to extend forwardly from the rear axle and pivotally connect with the body-frame in front of said axle, as shown in Fig. 9 wherein links W' have their rear ends pivotally connected with the rear axle and their forward ends pivotally connected with the body frame at points forward of the rear axle. Such arrangement is however not so desirable for the obvious reason that when the rear axle has been brought into position oblique to the length of the body frame the wheel of said axle which is then the farthest from the body-frame will be at the side of the machine from which the forward end of the diagonal blade projects, if the axle has been thus adjusted to overcome the side draft, and under such circumstances, the machine cannot run close to a bank.

In place of the winding drum and chain, I may use various devices for operating the rear axle; but deem it unnecessary to herein illustrate and describe the various arrangements of gears, levers and the like which will be obvious to a skilled mechanic.

While I have herein employed, in connection with the longitudinally movable rack-bars P, certain independent adjustable blade-suspending devices comprising hangers and vibratory levers, I may also use other known or suitable adjustable blade-suspending devices.

What I claim as my invention is—

1. The combination substantially as hereinbefore set forth, in a machine for making and repairing roads, of a body-frame pivotally supported upon the front axle, a diagonally arranged scraper blade carried below the body-frame and arranged to extend across the space between the front and rear wheels, and a rear axle arranged to have a combined horizontally swinging and end movement independently of the body-frame and connected with the latter by swinging links which control said movement of the rear axle.

2. The combination substantially as hereinbefore set forth in a machine for making and repairing roads, of a body-frame pivotally supported upon the front axle, a diagonally adjustable scraper-blade carried below the body-frame and arranged to extend across the space between the front and rear wheels, a rear axle having a combined horizontally swinging and end movement independent of the body-frame, links connecting the end portions of the rear axle with the body-frame so as to control the rear axle in its said movement, and means suitable for shifting the rear axle toward one and the other side of the machine so that when thus operated it will also swing by reason of its link connection with the body-frame.

3. The combination substantially as hereinbefore set forth in a machine for making and repairing roads, of the body-frame pivotally supported upon the front axle, a diagonally adjustable scraper-blade arranged to extend across the space between the front and rear wheels, the rear axle having a combined horizontally swinging and end movement independently of the body-frame, and links connecting the end portions of the rear axle with the body-frame and converging toward the latter for the purpose described.

4. The combination substantially as hereinbefore set forth in a machine for making and repairing roads, of a body-frame pivotally supported upon the front axle, a diagonally adjustable scraper-blade carried below the body-frame and arranged to extend across the space between the front and rear wheels, a rear axle having a combined horizontally-swinging and end movement and connected with the body-frame by controlling swinging connections, and means for operating the rear axle consisting of a chain connected therewith and a winding device for operating the chain.

5. The combination substantially as hereinbefore set forth in a machine for making and repairing roads, of a body-frame pivotally supported upon the front axle, a diagonally adjustable scraper-blade carried below the body-frame and arranged to extend across the space between the front and rear wheels, the rear axle having a combined swinging and end movement independently of the body-frame, controlling links connecting the end portions of the rear axle with the body-frame, a hand-wheel shaft mounted upon the body-frame, and a chain operated from the hand-wheel shaft and connected with the rear axle for the purpose described.

6. The combination substantially as hereinbefore set forth in a machine for making and repairing roads of the body-frame pivotally connected with the front axle, the diagonally adjustable scraper-blade arranged to extend across the space between the front and rear wheels, the rear axle having a combined horizontally-swinging and end movement independently of the body-frame, controlling links connecting the rear axle with the body-frame, a chain for operating the axle connected with the middle of the same, a rotary shaft from which the chain is operated, and a latch for locking the rotary shaft.

7. The combination with the diagonally adjustable scraper-blade, and a hand-wheel for operating means whereby the scraper-blade can be raised and lowered, of a swinging brake arm provided with a shoe arranged to engage the hand wheel, a spring for applying the shoe to the hand-wheel, and a compound lever for operating the brake arm so as to free the shoe from the hand-wheel, substantially as set forth.

8. The combination with the diagonally adjustable scraper-blade in a machine for making and repairing roads, of a hand-wheel for operating means whereby the scraper-blade can be raised and lowered, the brake lever T, provided with a shoe and spring for applying the shoe to the hand-wheel, a compound lever V, a rod 45, connecting the compound lever with the brake arm, and a foot piece 48, on the compound lever.

9. The combination substantially as hereinbefore set forth, in a machine for making and repairing roads, of a body-frame pivotally connected with the front axle, a diagonally adjustable scraper-blade arranged to extend across the space between the front and rear wheels, the rear axle extending through guide-ways on the body-frame and having a combined horizontally swinging and end movement, swing links connecting the end portion of the rear axle with the body-frame at points in rear of said axle, a winding device supported upon the body-frame, cord or chain connection between the winding device and rear axle, and guide-pulleys for said cord or chain connection supported upon the body-frame.

MORTON G. BUNNELL.

Witnesses:
HARRY COBB KENNEDY,
FREDK. H. MILLS.